United States Patent [19]

Brewer

[11] Patent Number: 4,643,167
[45] Date of Patent: Feb. 17, 1987

[54] OVEN VENTILATION SYSTEM
[75] Inventor: David E. Brewer, Wichita, Kans.
[73] Assignee: Pizza Hut, Inc., Wichita, Kans.
[21] Appl. No.: 718,894
[22] Filed: Apr. 2, 1985
[51] Int. Cl.[4] .......................................... F24C 15/20
[52] U.S. Cl. .................................. 126/299 R; 98/36;
126/273 A; 126/299 D; 126/276
[58] Field of Search ............. 98/36; 126/41 C, 273 A,
126/276, 299 R, 299 D, 279

[56] References Cited

U.S. PATENT DOCUMENTS

| | | | |
|---|---|---|---|
| 2,216,873 | 10/1940 | Browne | 126/273 A |
| 2,634,718 | 4/1953 | Williams | 126/299 R X |
| 3,303,839 | 2/1967 | Tavan | 126/299 D |
| 3,384,067 | 5/1968 | Rawald et al. | 126/299 R X |
| 3,513,766 | 5/1970 | Ahlrich | 126/299 D |
| 3,530,784 | 9/1970 | Courchesne | 126/299 D |
| 3,589,266 | 6/1971 | Hike et al. | 126/299 D |
| 4,047,519 | 9/1977 | Nett | 126/299 D |
| 4,180,049 | 12/1979 | Carr et al. | 126/273 A X |
| 4,556,046 | 12/1985 | Riffel et al. | 126/299 D |

FOREIGN PATENT DOCUMENTS

| | | | |
|---|---|---|---|
| 1079726 | 12/1954 | France | 126/276 |
| 2430568 | 2/1980 | France | 126/273 A |
| 104430 | 6/1983 | Japan | 126/299 D |

Primary Examiner—Harold Joyce
Attorney, Agent, or Firm—Willian Brinks Olds Hofer Gilson & Lione Ltd.

[57] ABSTRACT

The invention is an oven ventilation system which uses sheets of moving air to remove heat and also to insulate the oven from the remainder of the room or vehicle in which the oven is located. More particularly, the ventilation system takes air from outside the room or vehicle and forms rapidly moving sheets of air which pass over the external surfaces of the oven. After passing over one or more of the external surfaces of the oven, the sheets of air are exhausted to the outside. Preferably, the ventilation system also comprises wall means for forming a chamber to separate the oven and ventilation system from the remainder of the room or vehicle.

20 Claims, 7 Drawing Figures

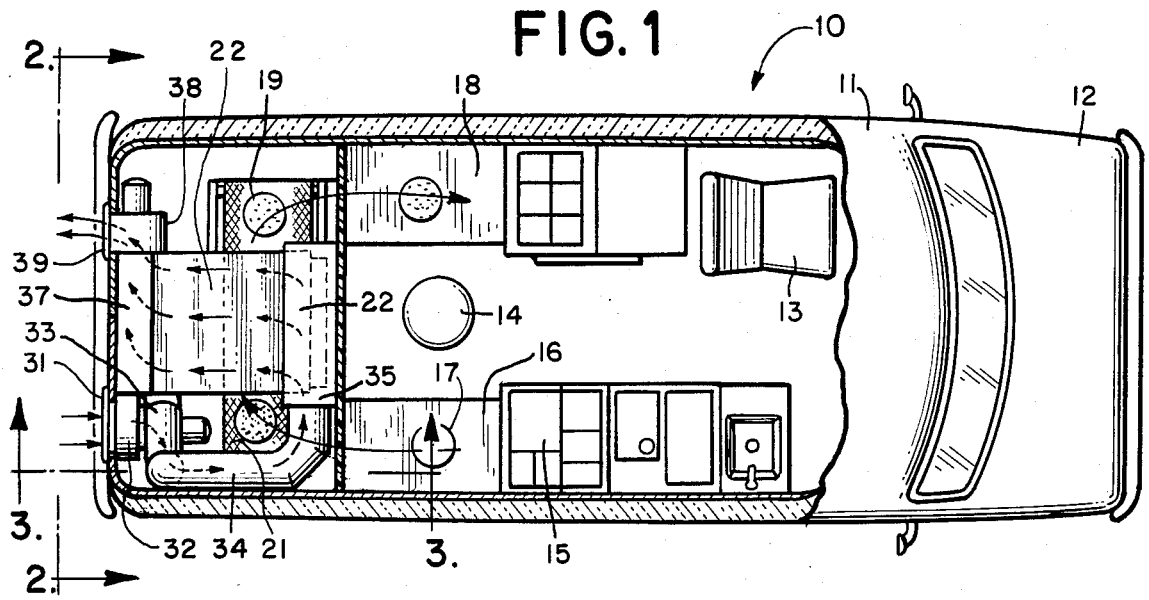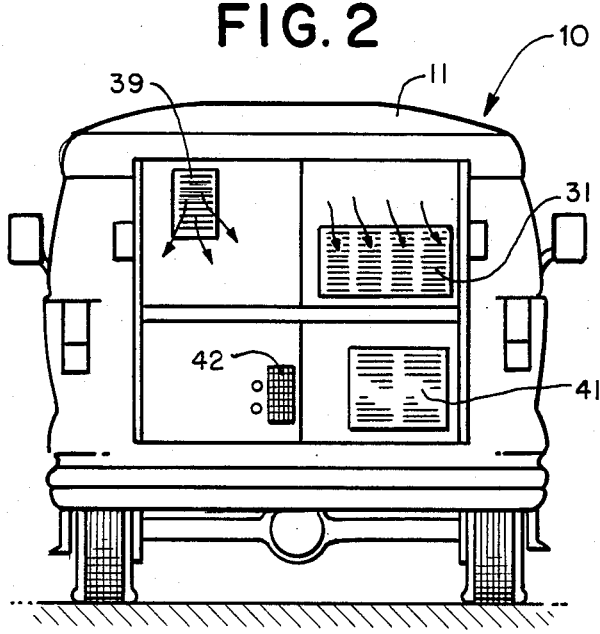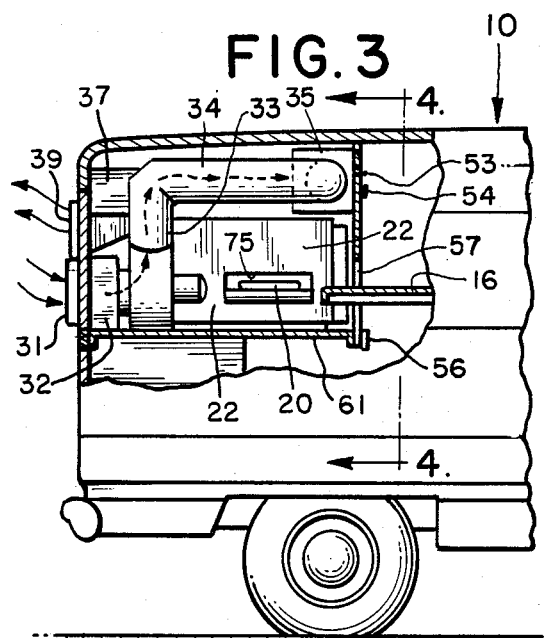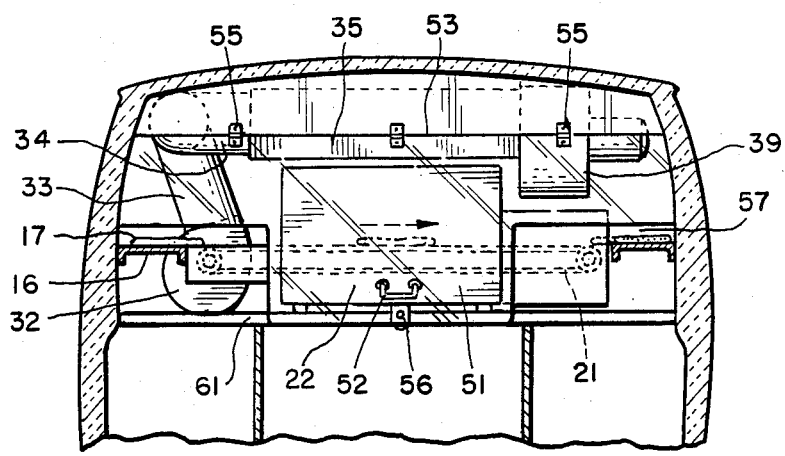

FIG. 5
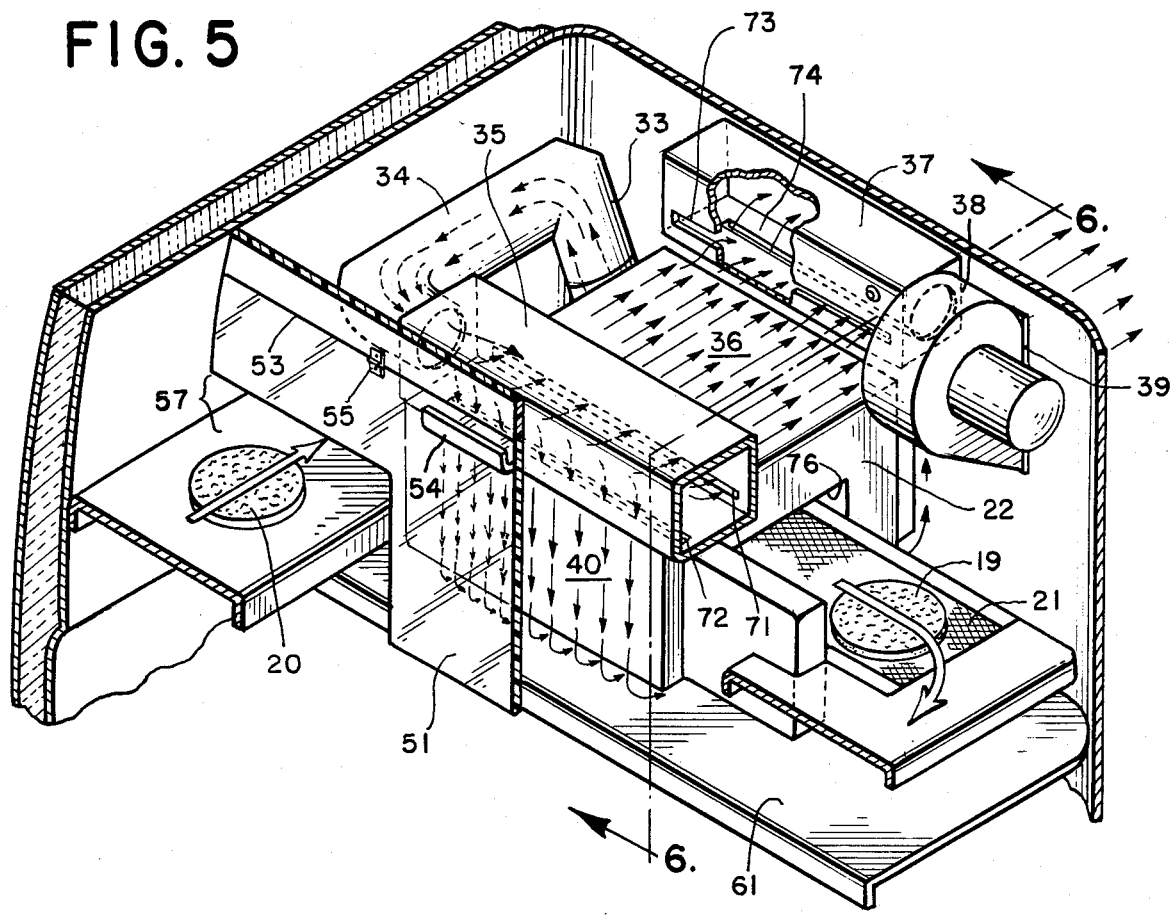
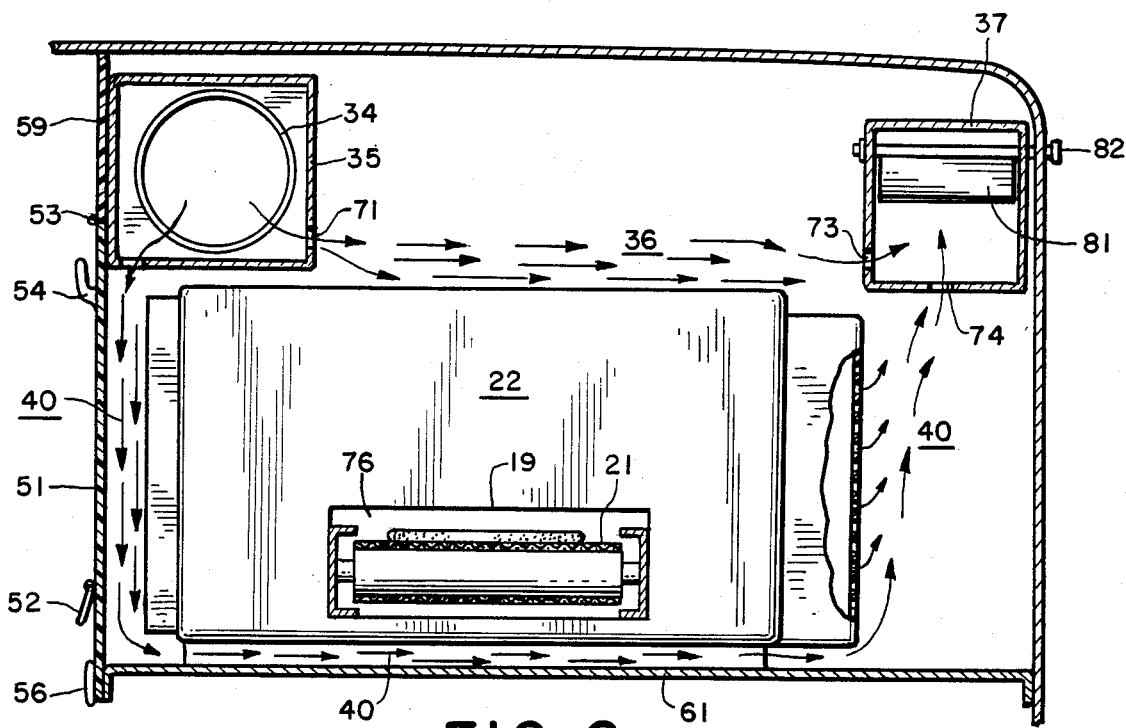
FIG. 6

OVEN VENTILATION SYSTEM

BACKGROUND OF THE INVENTION

The present invention relates to an oven ventilation system. By way of example, such a ventilation system is particularly useful for venting an oven in a food preparation vehicle, such as a pizza delivery vehicle wherein the pizza is both cooked and delivered.

In the past, pizza enthusiasts have generally found it necessary to leave their homes or places of work and travel to a pizza restaurant if they wanted a high quality fresh baked pizza. Although other methods of obtaining a pizza, such as purchasing a frozen pizza, cooking a fresh pizza from scratch or ordering pizza for delivery, have been available for some time, these alternatives to visiting a restaurant are not without drawbacks. For example, frozen pizzas tend not to have the same high quality flavor and consistency as fresh pizzas, and of course, it is often inconvenient to bake a pizza from scratch. Further, ordering a pizza for delivery often results in disappointment for the pizza enthusiast. The delivered pizza is often lukewarm and soggy, and it may have lost flavor en route to the consumer.

Although the pizza industry has attempted to provide convenient delivery service to consumers, the problems attendant with traditional delivery systems have limited the market. For example, it has been difficult or impossible to guarantee the quality of delivered pizzas because of the lack of control over the pizzas once they leave the restaurant.

Until recently, the concept of preparing and cooking pizza in a vehicle en route to delivery destination had not been seriously considered, perhaps at least in part because the difficulties presented by ventilating a pizza oven, which typically operates at temperatures of 500° F. and above, discouraged this approach. However, U.S. patent application Ser. No. 599,497 entitled Pizza Preparation and Delivery System and assigned to the assignee of the present invention, discloses a pizza delivery system in which a pizza is prepared and cooked in a moving vehicle en route to its delivery destination.

In the past, pizzas have been cooked in restaurants or in residential dwellings, where ventilation could be provided by a variety of means. But traditional hood systems in a moving vehicle are not suitable for ventilating a pizza oven for a variety of reasons.

One problem is attributed to the space limitations. While traditional oven ventilation systems involve large hoods with large ducts, the ventilation system of a pizza preparation and delivery vehicle must be relatively compact. In particular, the vehicle itself should be as compact as possible in order to conserve energy costs. Nevertheless, space is required for preparing the pizzas, as well as for storing the pizza shells and the pizza topping ingredients. Thus, a compact pizza preparation and delivery vehicle lacks the space otherwise required by the hoods and ductwork associated with traditional oven ventilation systems.

Another problem which is likewise attributable to the space limitations involved with the above type of vehicle is the fact that since the inside of the vehicle is so small, it is necessary that the ventilation system be extremely efficient and completely reliable. That is, due to its small size the inside of the vehicle can overheat in a very short time span if the ventilation system has insufficient capacity or is not operating properly.

Two other problems relate to the energy costs of operating the pizza preparation and delivery vehicle. First, it is naturally desirable for the oven ventilation system to draw as little power as possible from vehicle's available power supply. Accordingly, it is necessary to vent the oven as efficiently as possible. Second, because the air inside the vehicle will often need to be cooled, i.e., by the vehicle's air conditioning system, it would be extremely inefficient to place an extra load on that system by pulling the conditioned air out of the vehicle with the oven ventilating system.

Still another problem relates to the external environment of the pizza preparation and delivery vehicle. Although traditional hoods have exhausting means in the roof or uppermost part of the hood, problems with weather, bridge clearances, wind resistance, as well as aesthetic considerations may in some cases militate against exhausting hood vapors through the top of the vehicle Many of these same problems are found in traditional oven ventilation systems which are not located in a vehicle. For example, many kitchens have space limitations which prohibit large hoods and ducts and likewise require an efficient heat removal operation. In addition, the cost of cooling air makes it undesirable to vent the cooled air out of the building with the oven ventilation system.

SUMMARY OF THE INVENTION

The present invention is an improved oven ventilation system. Briefly, the ventilation system comprises an intake means for taking air from the outside of the enclosed space where the oven is located and means for forming sheets of that outside air to be passed across a plurality of the external surfaces of the oven. These sheets of air function as insulating layers between the external surfaces of the oven and the rest of the enclosed space. An exhaust means is also provided whereby the sheets of air are collected and exhausted to the outside of the space after they have passed across the external surfaces of the oven.

In accord with one preferred embodiment of the present invention, the oven is located within a food preparation vehicle. The intake means includes a blower located in an intake chamber which communicates with the outside of the van. The sheets of air are formed by pushing the intake air through two outlet apertures in a plenum chamber which communicates with the intake chamber. One outlet aperture is positioned so as to cause a sheet of air to pass across the top external surface of the oven, while the other is positioned to cause a sheet of air to pass across the front external surface. Each of these apertures is preferably in the form of a narrow slit through a wall of the plenum chamber and long enough to create a sheet of air across the entire top and front surfaces respectively. A wall means is also included in this embodiment which functions to separate the oven and ventilation system from the remainder of the vehicle. The wall means is generally parallel to the front surface of the oven and further serves to direct a sheet of the air down the front surface and around the corner between the front and bottom surface. The sheets of air are exhausted by means of an exhaust chamber with two inlet apertures through which the sheets of air are sucked by the negative pressure created by an exhaust blower. The inlet apertures are aligned so as to receive each sheet of air. In addition, the inlet apertures are of similar shape and size to the outlet apertures of the plenum chamber.

BRIEF DESCRIPTION OF THE DRAWINGS

The present invention, together with attendant objects and advantages, will be best understood with reference to the detailed description and accompanying drawings, wherein:

FIG. 1 is a top view in partial cutaway of a pizza preparation and delivery vehicle including an oven ventilation system made according to a preferred embodiment of the present invention.

FIG. 2 is a rear view of the pizza preparation and delivery vehicle shown in FIG. 1.

FIG. 3 is a cross-sectional view, showing the right side of the oven and ventilation system, and taken along line 3—3 of FIG. 1.

FIG. 4 is a cross-sectional view showing the front of the oven and ventilation system, and taken along line 4—4 of FIG. 3.

FIG. 5 is a top perspective view the oven and ventilation system of FIG. 1.

FIG. 6 is a cross-sectional view showing the arrangement of the oven and ventilation system, and taken along line 6—6 of FIG. 5.

DETAILED DESCRIPTION

Figure 7:
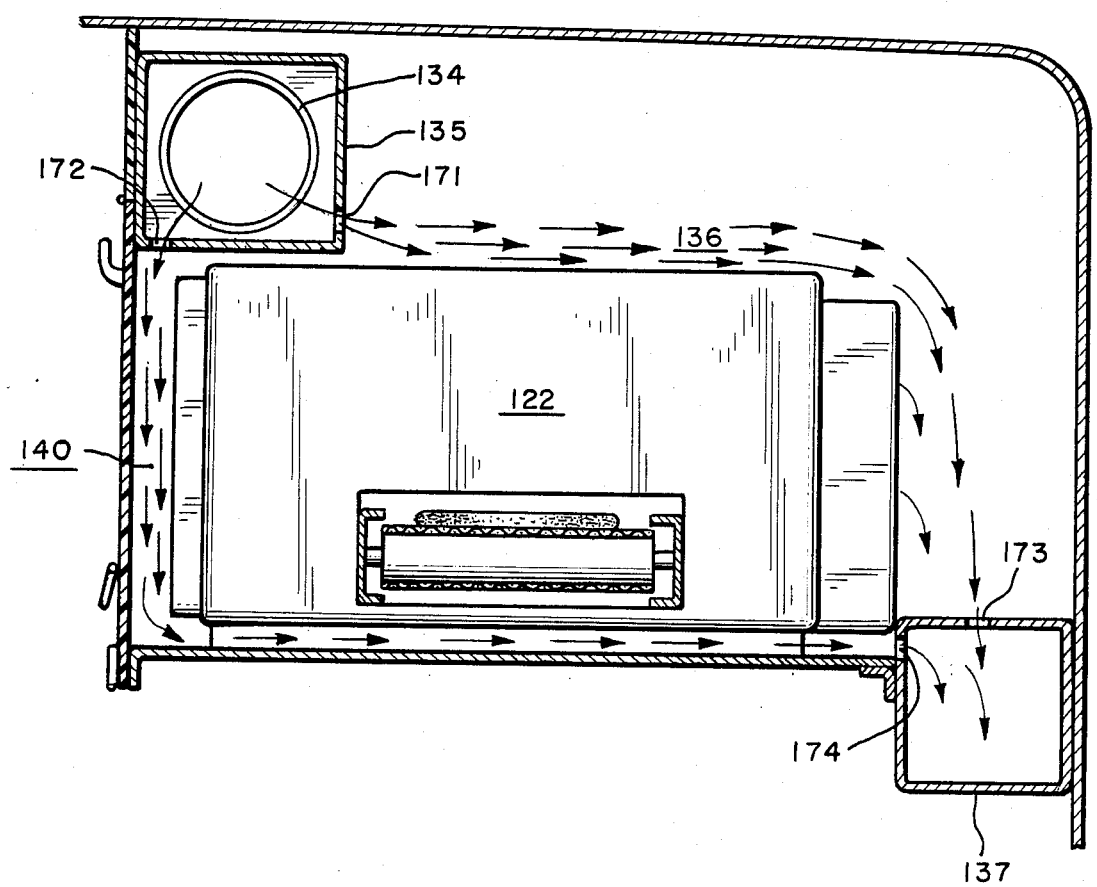
FIG. 7 is a view similar to FIG. 6, illustrating an alternative embodiment of the present invention.

Referring to the drawings, FIGS. 1-6 all refer to the same pizza preparation and delivery vehicle 10 which includes an oven ventilation system made in accordance with a preferred embodiment of the present invention.

FIG. 1 is a top view of the pizza preparation and delivery vehicle 10 with a portion of the roof 11 removed for this drawing. As mentioned above, the oven ventilation system of the present invention exhibits particular advantages for venting ovens operating in compact spaces and where high efficiency is required. Accordingly, this ventilation system is especially well suited for use in a food preparation vehicle, i.e., where space and energy are obviously limited. Even more specifically, inspite of the relatively high operating temperatures of a pizza oven and the strict limitations on space, the invention has proven successful when used in a pizza preparation and delivery vehicle. Nevertheless, it should be noted that the present invention is not limited to such applications and the ventilation of stationary ovens is also within the scope of the present invention.

The pizza preparation and delivery vehicle depicted in FIG. 1 includes a typical van 12 (in this case a Ford "Econoline") which has been modified to carry the required facilities. The vehicle includes a seat 13 for the driver and a seat 14 for the pizza preparer. A pizza shell 17, i.e., a partially assembled pizza including at least the uncooked pizza crust, is placed on the preparation shelf 16 whereon various ingredients are added from the trays 15. The uncooked pizza is then placed on a conveyor 21 which moves it into the conveyor oven 22 through the input slot 75 (see FIG. 3) and out of the oven through the output slot 76 (see FIG. 5). After the pizza exits from the oven 22 it is placed on the shelf 18 where it is cut and otherwise made ready for delivery.

The oven used in this embodiment was purchased from Lincoln Mfr. of Fort Wayne, Ind. from their Model 1100 series. Specifically, this oven is a prototype two-foot "impinger" oven provided by Lincoln Mfr. for this application. The oven was also extensively modified for this use to use LP gas burners rather than electrical heating elements. In particular, the company of Gas Consultants in Independence, Ohio removed the electrical heating elements and replaced them with a forced combustion burner including a blower for creating an internal draft in order to circulate the combustion products. The oven 22 is designed with an average output of about 30,000 B.T.U. and operates with a consumption of about 1 pound of LP gas per hour. The oven does not have a flue, but rather relies on the open slots 75 and 76 to exhaust the combustion products.

Although specific details of the vehicle 12 and the oven 22 have been provided, it should be understood that neither the vehicle nor the oven form a part of the invention which is the ventilation system for an oven. Accordingly, specifications for the vehicle, if one is used with the present invention, and the oven should be selected so as to be suited for the intended application.

FIG. 2 which is a view of the rear of the vehicle 10, shows the intake louver 31 and the exhaust louver 39. Also in the back of the vehicle 10 is an intake louver 41 for an electric generator (not shown) and an outlet louver 42 for the same generator. By means of an electric intake blower (not shown) which is located within an intake blower chamber 32, air from the external environment of the vehicle is brought in through the intake louver 31. The blower used in this embodiment is powered by an electric motor, is capable of impelling free air at 980 cubic feet per minute, has a rating of 115 volts and 60 Hz., and operates at about 1,030 revolutions per minute. This particular blower was purchased from W. W. Granger Corp. and bears a part number of 4C-054. Preferably, an air filter is placed between the intake louver 31 and the blower. The air filter can be a typical fiberglass furnace filter.

As can be seen in FIG. 3 the intake blower chamber 32 communicates with an ascending duct 33 which in turn communicates with a horizontal duct 34 which in turn communicates with a generally rectangular plenum chamber 35. The ducts are of circular cross section and have a diameter of about 6 inches. The plenum chamber has a square cross section with about 7 inch sides. Each of these chambers and ducts is formed from standard 20 gauge galvanized steel. As shown by the arrows, the intake blower impells air from outside of the vehicle through the louver 31 and air filter (not shown). The air is then impelled through the ducts 33 and 34 into the plenum chamber 35.

As best seen in FIG. 5, the air is allowed to exit the plenum chamber 35 through the outlet apertures 71 and 72, thereby creating a sheet of air 36 as the air is forced out through the outlet aperture 71, and a second sheet of air 40 as the air is forced out through the outlet aperture 72. Each outlet aperture is in the shape of a narrow slit which is longer than the oven 22 and is aligned so as to extend beyond both sides of the oven. In addition, each outlet aperture has a width closest to the duct 34 which is approximately ½ inch, the slit steadily increases in width, reaching a width of of approximately 1 inch at its end distant from the ducts 34. This widening of the slits along the line moving away from the duct 34 is intended to compensate for pressure differences within the plenum chamber 35 in an attempt to create sheets of air 36 and 40 which are reasonably uniform in velocity and pressure.

Referring to FIG. 6, the plenum chamber 35 and the outlet apertures 71 and 72 are positioned so that the bottom of the outlet aperture 71 is approximately 1.25 inches above the top of the oven 22, and so that the back side of the outlet aperture 72 is approximately 1.25 inches in front of the front surface of the oven. As can be seen, the sheet of air 36 which is formed by the outlet aperture 71 passes across the top surface of the oven after which it is drawn in through the inlet aperture 73 to the exhaust chamber 37. The inlet aperture 73 is positioned at approximately the same height above the top of the oven 22 and has the same dimensions as the outlet aperture 71. That is, the inlet aperture 73 is approximately ½ inch in width at the end closest to the exhaust blower 38, and approximately 1 inch in width at the other end. This differing width is again intended to compensate for pressure differences in the exhaust chamber 37.

FIG. 6 also shows that a second sheet of air 40 is formed by the air being forced out of the plenum chamber through the aperture 72. The aperture 72 is positioned so that the rear edge of the slot is approximately 1 and ¼ inch in front of the front surface of the oven. This sheet of air 40 passes across the front surface of the oven 22. In addition, the sheet of air 40 is made to bend around the bottom front corner of the oven so that it likewise passes across the bottom surface of the oven. The sheet 40 passes through the space between the bottom of the oven 22 and the oven shelf 61 which is provided by the legs 60. In particular, a wall member 51 is provided in front of the front surface of the oven. This wall 51 is generally planar and positioned parallel to and spaced apart from the front surface of the oven. The presently preferred space between the wall 51 and the front of the oven is about two inches.

The bottom portion 58 of the wall 51 is preferably made from transparent plexiglass ¼ thick and is hinged at 53 in order to allow the wall to be swung upward to obtain access to the oven 22. The top portion 59 is preferably made from ¼ inch "Chemlite". Also, the wall 51 is preferably T-shaped so as to be longer in the center and shorter across the shelves 16 and 18. In particular, the wall is intentionally short enough to leave a gap 56 between the wall and the shelves 16 and 18 in order to allow the pizzas to be put onto and taken off of the conveyor. In this preferred embodiment, that gap 56 is 3 inches. For convenience of the pizza preparer, a ticket rail 54 is provided to hold the orders.

The wall 51 in combination with the oven shelf 61 confine the sheet of air 40 and cause it to go under the oven 22. The sheet of air 40 rounds the bottom back corner of the oven 22 and passes across the back of the oven. The sheet 40 is then drawn into the exhaust chamber 37 through the inlet aperture 74. The inlet aperture 74 is of the same dimensions as the other inlet aperture 73.

In addition, the wall serves the important function of separating the oven and ventilation system from the rest of the vehicle. This is beneficial as it prevents the air used for ventilating the oven from mixing with the air in the rest of the vehicle. This result increases the efficiency of the system in two ways. First, because the ventilating air is kept from mixing with the other air, there is very little heat transferred from the ventilation air to the rest of the air in the vehicle. Second, the separation of the ventilation system helps prevent the inadvertent exhausting of the conditioned air from the rest of the vehicle.

It should be noted that the main purpose of the wall 51 is to enclose the ventilation system. That is, the wall is not intended to serve as a thermal insulator, but rather as a separator of the air contained on either side of the wall. It is for this reason that the wall can be formed from a material such as plexiglass.

The exhaust chamber 37 is of approximately the same dimensions as the plenum chamber 35 and is likewise made from 20 gauge galvanized steel. The exhaust chamber 37 communicates with the exhaust blower chamber 38 which in turn communicates with the outside of the vehicle through the exhaust louver 39. The exhaust blower is preferably of the same construction as the intake blower. A damper 81 is included in the exhaust chamber 37 for the purpose of adjusting the air flow through the chamber. In particular, by means of the handle 82, the damper is adjusted, preferably so that the exhaust blower is pulling no more air out of the vehicle than the intake blower is putting in. In other words, the exhaust rate is preferably adjusted so that the venting system uses only unconditioned air from the outside of the vehicle to vent the oven. In this way, conditioned air is not pulled from the vehicle. This is an important advantage of the present invention, particularly when the ventilation system is located within a vehicle.

A relatively simple method of testing the adjustment of the exhaust rate is to feel for a draft at either of the gaps 56 between the wall 51 and the shelf 16 or 18. For even finer adjustment, a lighted match can be put in front of either gap 56 and the damper is adjusted to prevent formation of a draft in either direction.

It should be noted that the blower motors for the ventilation system of this embodiment are wired so as to turn on automatically whenever the oven is turned on. In addition, for protection of the oven and the contents of the vehicle as the oven cools down, the blower motors are timed to remain on for 25 minutes after the oven is shut off. In this particular embodiment, this delayed shut-off of the blower motors is accomplished by tying the blower motors into the circuit already included in this conveyor oven 22 which keeps the internal fans of the oven running after the oven is turned off. Also, as a safety measure, a complete shut down of every system on the vehicle can be accomplished by pushing an emergency button (not shown) which is located on the dash by the steering wheel.

As best seen in FIG. 5 in combination with FIG. 6, the ventilation system of this embodiment of the present invention operates by forming relatively thin sheets of air 36 and 40 which pass across the top, front, bottom and back external surfaces of the oven 22. These sheets of air actually serve two functions in the ventilation system. Their first function is to provide a thermal barrier or insulating layer between the oven and the rest of the air in the vehicle. That is, the sheets provide an insulating layer between the oven and the inside of the vehicle. In other words, before heat can be transferred from these surfaces of the oven, it has to pass through this layer provided by the sheets of air.

The second function of the sheets of air is to remove excess heat generated at the external surfaces of the oven. In particular, the sheets are in contact with these four surfaces of the oven and can therefore absorb heat from the surfaces. The heated air is quickly exhausted from the vehicle before it transfers this heat to the rest of the air in the vehicle.

The inventor has discovered that by combining these two functions in one means, i.e., the moving sheets of air, he has enhanced each function. First, the insulating function is enhanced because even though the air in the sheet is continuously absorbing heat from the oven, the air is simultaneously being exhausted and replaced. As a result, the sheet is an improved insulating means because it does not store heat which would otherwise eventually be transferred to the other side of the insulator. Instead, a continually renewed insulator is provided.

Second, the heat removal function is enhanced by the insulating function because the insulating nature of the sheets confines the heat of the oven to a more limited space thereby making removal more efficient. In other words, the fact that the sheets serve as an enclosure of the space around the oven, the heat from the oven is kept from widely dispersing. As a result, the heat is kept more concentrated and can therefore be removed more efficiently.

In this preferred embodiment, it should be noted that the velocity of the air in the sheets of air is relatively great. In particular, the fans are each capable of impelling air at about 980 cubic feet per minute and the apertures 71-74 are relatively narrow. As a result, the sheets of air 36 and 40 in this embodiment leave the outlet apertures at approximately 22 feet/second. Expressed in other terms, it has been calculated that this ventilation system completely replaces the air within it every 30 seconds. This relatively high velocity of the air within the sheets 36 and 40 increases the efficiency of the ventilation system in that the air is so rapidly removed from the system after it has absorbed heat from the oven.

Because the apertures 71-74 are longer than the oven, the sheets of air extend beyond the edges of the oven. However, it should be noted that in this preferred embodiment, sheets of air are not made to pass across the side surface of the oven 22. The inventor has discovered that passing air across only the top, front, bottom and back sides as in the preferred embodiment, provides sufficient ventilation of the oven. This proves advantageous in that the sides of this conveyor oven 22 will have the pizzas going in and out which would periodically interrupt sheets of air for the sides of the oven. Additionally, it is desirable to not form air currents around the open slots 75 and 76 which could carry air into or out of the oven. That is, it would be disadvantageous to have a ventilation system which lowered the efficiency of the oven by inadvertently sweeping cool air into the oven or taking the heated air out of it.

FIG. 7 shows an alternative embodiment of the present invention. The fundamental difference in this alternative embodiment is the position of the exhaust chamber 137. In particular, the exhaust chamber 37 in this embodiment is located near the bottom of the back side of the oven 22. Also, the location of the inlet apertures 173 and 174 have been changed. The apeture 173 is positioned at the top of the exhaust chamber 137 near the front edge. The aperture 174 is located on the front of the exhaust chamber 137 near the top. In this way, the inlet apertures are properly aligned to receive the sheets of air 136 and 140. As can be seen, this allows the sheet 136 to pass across the top and the back surface of the oven 122, while the sheet 140 is allowed to pass across the front and bottom surface of the oven.

It should be noted that these particular embodiments are depicted and described only by way of example and thus should be regarded as illustrative rather than limiting. In particular, although the embodiments depicted above involved using the ventilation system for a pizza oven in a delivery vehicle, the present invention is certainly not limited to such application. Also, the present invention is not limited to use with conveyor ovens. Indeed, it must be understood that it is the appended claims which define the scope of this invention.

I claim:

1. A ventilation system for venting an oven with external surfaces, the oven being located within an enclosed space, the system comprising:
    intake means for collecting air from the external environment of the enclosed space;
    means for forming a sheet of said air and passing the sheet across a plurality of the external surfaces of the oven; and
    exhaust means for exhausting the sheet of said air to the external environment of the enclosed space after said air has been passed across said external surfaces.

2. The ventilation system of claim 1 wherein the means for forming and passing a sheet of said air comprises a plenum chamber communicating with the intake means and with an outlet aperture through which the air is forced out, the aperture being positioned and shaped so as to cause the sheet of said air to pass across said plurality of external surfaces.

3. The ventilation system of claim 2 wherein the outlet aperture is a narrow slit in the plenum chamber of a length sufficient to cause the sheet of air to pass across substantially all of one of said plurality of external surfaces.

4. The ventilation system of claim 2 wherein the exhaust means comprises an inlet aperture through which the sheet of air is forced into an exhaust chamber after the sheet has passed across said surfaces.

5. The ventilation system of claim 4 wherein the outlet aperture of the plenum chamber is positioned above the top surface of the oven and the inlet aperture of the exhaust chamber is positioned below the bottom surface of the oven.

6. The ventilation system of claim 1 further comprising wall means for forming a ventilation chamber containing the oven, thereby substantially isolating the oven from the remainder of the enclosed space.

7. The ventilation system of claim 6 wherein the wall means comprises a front wall positioned substantially parallel to the front surface of the oven and spaced apart therefrom a distance sufficient to allow said sheet of air to pass between the front wall and the front surface.

8. A ventilation system for venting a substantially rectangular box shaped oven with top, front, bottom and back external surfaces, said oven being located in a food preparation vehicle, the system comprising:
    intake means for collecting air from the external environment of the vehicle;
    means for forming sheets of said air and passing said sheets across the top, front, bottom, and back external surfaces of the oven; and
    exhaust means for exhausting said air to the external environment of the vehicle after said air has been passed across said surfaces.

9. The ventilation system of claim 8 wherein the means for passing sheets of said air comprises a plenum chamber communicating with the intake means and with a first and a second outlet aperture through which the air is forced out, the first aperture being positioned and shaped so as to cause a first sheet of said air to pass across a first one of the external surfaces of the oven, the second aperture being positioned and shaped so as to cause a second sheet of said air to pass across a second one of said external surfaces of the oven.

10. The ventilation system of claim 9 further comprising wall means for forming a ventilation chamber containing the oven, thereby substantially isolating the oven from the remainder of the internal environment of the vehicle.

11. The ventilation system of claim 10 wherein the wall means comprises a front wall positioned substantially parallel to the front surface of the oven and spaced apart therefrom a distance sufficient to allow a sheet of air to pass beteen the front wall and the front surface.

12. The ventilation system of claim 11 wherein each outlet aperture is a narrow slit in the plenum chamber of sufficient length to cause each sheet of air to pass across substantially all of the respective surfaces.

13. The ventilation system of claim 11 wherein the exhaust means comprises an inlet aperture through which a sheet of air is forced into an exhaust chamber said air has passed across an external surface of the oven.

14. The ventilation system of claim 11 wherein the exhaust means comprises a first inlet aperture through which the air, which was forced out of the first apeture of the plenum chamber, is forced into an exhaust chamber after said air has passed across a surface of the oven; and a second inlet aperture through which the air, which was forced out of the second aperture of the plenum chamber, is forced into the exhaust chamber after said air has passed across another surface of the oven.

15. The ventilation system of claim 14 wherein the first inlet aperture of the exhaust chamber is of approximately the same dimensions as the first outlet aperture of the plenum chamber.

16. The ventilation system of claims 14 wherein the plenum chamber and the first outlet aperture are positioned so as to cause the first sheet of air to pass across the top surface of the oven and the second outlet aperture is positioned so as to cause the second sheet of air to pass across the front surface of the oven.

17. The ventilation system of claim 14 wherein the exhaust chamber and the first inlet aperture are positioned so as to exhaust the first sheet of air after said air has passed across the top surface of the oven, and the second inlet aperture is positioned so as to exhaust the second sheet of air after said air has passed across the front, bottom and back surface of the oven.

18. The ventilation system of claim 14 wherein the exhaust chamber and the first inlet aperture are positioned so as to exhaust the first sheet of air after said air has passed across the top and back surface of the oven, and the second inlet aperture is positioned so as to exhaust the second sheet of air after said air has passed across the front and bottom surface of the oven.

19. In an oven and oven ventilation system for use in cooking pizzas in a pizza delivery vehicle, comprising an oven located in such a vehicle, the oven being of substantially rectangular cross section and having a top, front and bottom external surface; the improvement comprising a ventilation system for the oven comprising:

intake means for collecting air from the external environment of the vehicle, said intake means comprising a blower positioned in an intake blower chamber communicating with the external environment of the vehicle;

a plenum chamber communicating with the intake blower chamber and with a first and second outlet aperture through which the air is forced out, the first aperture being positioned and shaped so as to cause a first sheet of said air to pass across the top external surface of the oven, the second aperture being positioned and shaped so as to cause a second sheet of air to pass across the front external surface of the oven;

wall means for forming a ventilation chamber containing the oven thereby preventing significant mixture of air from the ventilation chamber with air from the internal environment of the vehicle, said wall means comprising a front wall which is positioned substantially parallel to the front surface of the oven and spaced apart therefrom a distance sufficient to allow said second sheet of air to pass between the wall means and the front surface; and exhaust means comprising an exhaust chamber comprising a first inlet aperture through which the first sheet of air, which was forced out of the first aperture of the plenum chamber, is forced into the exhaust chamber after said air has passed across the top external surface of the oven; and a second inlet aperture through which the second sheet of air, which was forced out of the second aperture of the plenum chamber, is forced into the exhaust chamber after said air has passed across the front and bottom external surface of the oven; said exhaust means further comprising an exhaust blower for exhausting air from the exhaust chamber to the external environment of the vehicle.

20. The oven and ventilation system of claim 19 wherein the oven is a conveyor type oven having an input slot on a first side of the oven, and an output slot on a second opposite side, each slot being uncovered during use of the oven.

* * * * *

UNITED STATES PATENT AND TRADEMARK OFFICE
CERTIFICATE OF CORRECTION

PATENT NO. : 4,643,167
DATED : February 17, 1987
INVENTOR(S) : David E. Brewer

It is certified that error appears in the above-identified patent and that said Letters Patent is hereby corrected as shown below:

In column 7, lines 2-3, please delete "the air" and substitute therefor --that air--;

In column 7, line 54, please delete "apeture" and substitute therefor --aperture--.

IN THE CLAIMS

In Claim 11 (column 9, line 12), please delete "beteen" and substitute therefor --between--;

In Claim 13 (column 9, line 19), after "chamber", please add the word --after--;

In Claim 14 (column 9, line 24), please delete "apeture" and substitute therefor --aperture--.

Signed and Sealed this

Fourth Day of October, 1988

Attest:

DONALD J. QUIGG

*Attesting Officer*  *Commissioner of Patents and Trademarks*